United States Patent [19]

Moriyama et al.

[11] Patent Number: 4,516,207

[45] Date of Patent: May 7, 1985

[54] APPARATUS FOR CONTROLLING AIR CONDITIONER BY VOICE

[75] Inventors: Masakazu Moriyama; Takao Saito, both of Aichi, Japan

[73] Assignee: Toyota Jidosha Kogyo Kabushiki Kaisha, Toyota, Japan

[21] Appl. No.: 352,022

[22] Filed: Feb. 24, 1982

[30] Foreign Application Priority Data

Mar. 9, 1981 [JP] Japan ................................. 56-33472

[51] Int. Cl.³ ........................ G05D 23/00; B60H 3/00; G06F 15/20
[52] U.S. Cl. ..................................... 364/424; 165/42; 237/5; 364/418; 381/42
[58] Field of Search ....................... 364/424, 425, 418; 165/42; 381/41, 42; 237/5; 340/52 F

[56] References Cited

U.S. PATENT DOCUMENTS

| | | | |
|---|---|---|---|
| 3,906,207 | 9/1975 | Rivere et al. | 364/425 |
| 4,259,722 | 3/1981 | Iwata et al. | 237/5 |
| 4,316,251 | 2/1982 | Saito et al. | 364/424 |
| 4,373,116 | 2/1983 | Shimizu et al. | 364/424 |
| 4,401,848 | 8/1983 | Tsunoda | 364/424 |
| 4,419,730 | 12/1983 | Ito et al. | 364/424 |
| 4,438,422 | 3/1984 | Nojiri et al. | 340/52 F |

*Primary Examiner*—Felix D. Gruber
*Attorney, Agent, or Firm*—Kenyon & Kenyon

[57] ABSTRACT

In an apparatus for controlling an air conditioner through a computer, various controls are automatically effected by voice command as well as by manual operation. Specific voice commands are predetermined in accordance with the control objectives. The voice commands are read by a voice recognizing equipment, whereby recirculated air-fresh air switching and air outlet switching are effected by a microprocessor in accordance with the commands, thereby eliminating necessity for manual operation.

6 Claims, 8 Drawing Figures

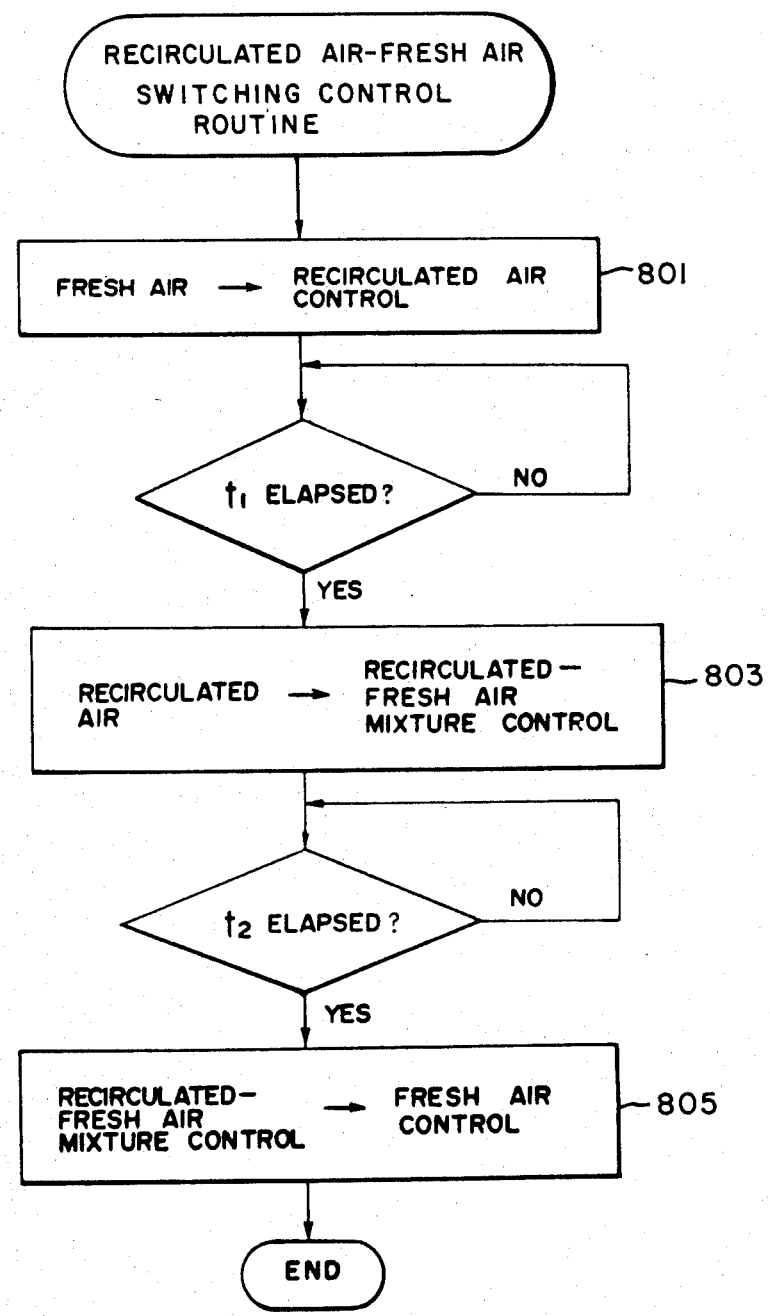

APPARATUS FOR CONTROLLING AIR CONDITIONER BY VOICE

BACKGROUND OF THE INVENTION

1. Field of the Invention

This invention relates to apparatus for controlling air conditioners, and particularly to such an apparatus for controlling a variety of air conditioning modes by use of a computer and a voice recognizing equipment.

2. Description of the Prior Art

Vehicles such as motor cars may be provided with air conditioners, with which ventilation, air cooling and the like may be performed as necessary. In the conventional air conditioners, all of the various operations such as selection of modes, regulation of air flow, control of air cooling and warming and the like have relied on the manual operation of an operator. Not only is manual operation cumbersome but also there is a possibility that safe driving is interfered with by manual operation made by the operator.

SUMMARY OF THE INVENTION

The present invention has as its object the provision of an apparatus for controlling an air conditioner by voice command, wherein switching between recirculated and fresh air delivery and switching of air outlets can be effected.

The present invention contemplates that, when predetermined voice commands for the switching between recirculated air and fresh air delivery or the switching of air outlets are pronounced, these voice commands are decoded by a voice recognizing equipment to control a computer program, thereby effecting the switching between recirculated air and fresh air delivery or the switching of air outlets.

BRIEF DESCRIPTION OF THE DRAWINGS

FIG. 8 is a process flow chart showing the internal air control.

DETAILED DESCRIPTION OF THE INVENTION

Figure 1:
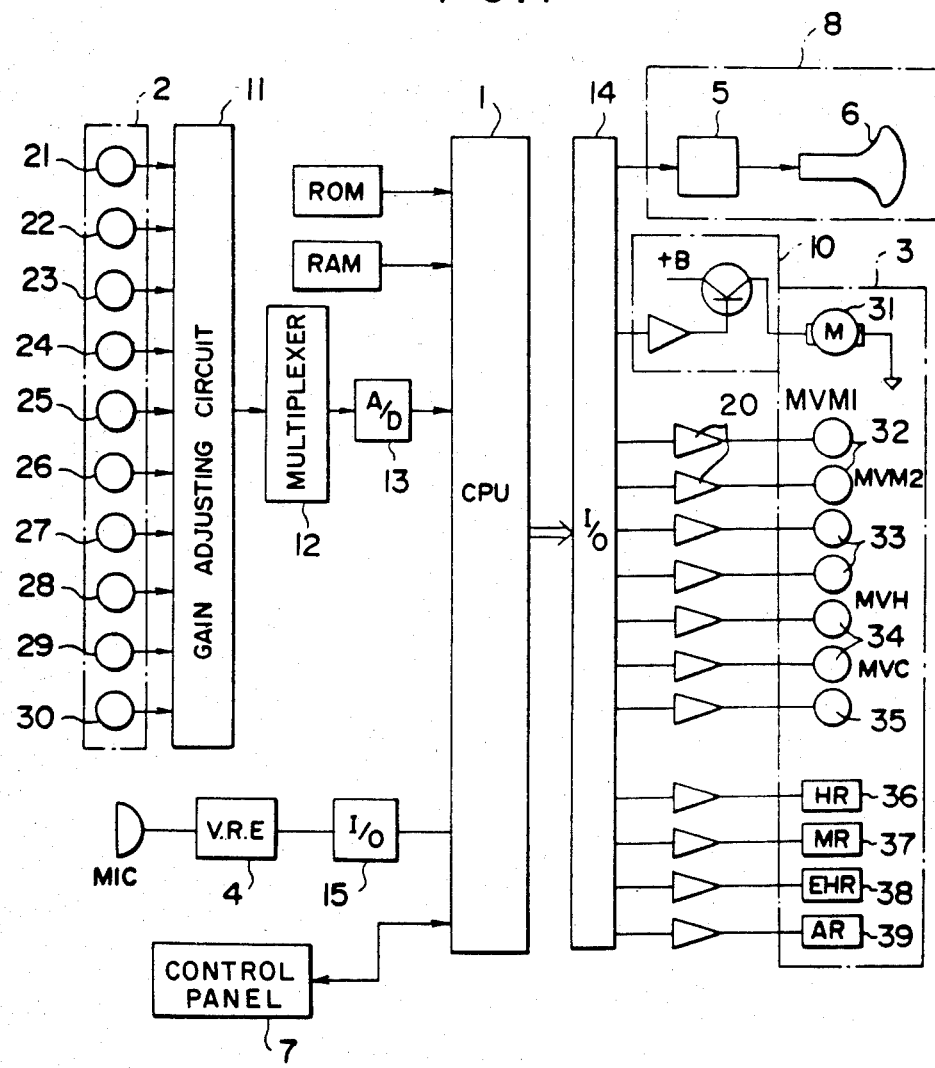
FIG. 1 is a block diagram showing one embodiment of the present invention.

FIG. 1 is a block diagram showing one embodiment of the present invention.

A central processing unit (hereinafter referred to as "CPU") 1 is connected with a sensor unit 2, a component 3 being controlled, a voice recognizing equipment 4, further, with ROM (READ ONLY MEMORY) and RAM (RANDOM ACCESS MEMORY) memories, and still further, with a multi-display device 8 (including a CRT controller 5 and a color CRT 6) for displaying various data.

The sensor unit 2 includes an internal temperature sensor 21, an external temperature sensor 22, a water temperature sensor 23, an evaporator outlet sensor 24, a potentiometer 25 for indicating an opening of air mix damper, a solar radiation sensor 26, a humidity sensor 27, a condensation sensor 28 and an air contamination sensor 29. Since these sensors have dispersions in detecting sensibility, output and the like, gains of these sensors are adjusted in a gain adjusting circuit 11. As a result, characteristics of outputs from the gain adjusting circuit 11 inputted to an A/D converter 13 at the succeeding step through a multiplexer 12 are adjusted to be uniform in analog level. The A/D converter 13 outputs a digital signal to CPU 1 corresponding to an inputted analog voltage to CPU 1.

The component 3 being controlled includes a blower motor 31 driven by a driving circuit 10, a valve 32 for switching the air outlets, a valve 33 for switching from recirculated air to fresh air delivery and vice versa, a valve 34 for an A/M damper, a water valve 35, a heater relay (HR) 36, a magnet clutch relay (MR) 37, an Ex-Hi relay (EHR) 38 and an air purifier control relay (AR) 39. The air outlets include openings for defroster (referred to as DEF), ventilator (referred to as VENT) and heater. The valve 32 comprises solenoid valves MVM1 and MVM2. Air from a blower is delivered through the air outlet for DEF when the solenoid valve MVM 1 is on and the solenoid valve MVM2 is OFF. The A/M damper (air-mixture damper) is provided in an air duct downstream of the blower and is used to mix heated air and cooled air so that desired delivered air temperature is obtained. The valve 34 comprises solenoid valves MVH and MVC. The opening of the A/M damper is controlled by both solenoid valves MVH and MVC. The water valve 35 is used to control flow rate of engine cooling water to a heater by which the air is heated. The heater relay 36 is provided as a main switch for the air conditioner, between the ignition switch and the air-conditioner, and is turned on while the ignition switch is on. The magnet clutch relay 37 is used to turn on or off a compressor compressing a refrigerant. The Ex-Hi relay 38 is used to control the air flow rate delivered from a blower through control of the blower motor speed. When the Ex-Hi relay 38 is on, the air flow rate becomes maximum. These parts are driven through drivers or amplifiers 20 which are controlled by CPU 1 through an I/O (input/output circuit) 14. The multi-display device 8 is driven by CPU 1 through I/O 14. In the preferred embodiment illustrated in FIG. 1, the air-conditioner is controlled by the CPU1.

Description will hereunder be given of the details of controls effected by CPU 1 as described above with reference to the flow charts.

Figure 2:
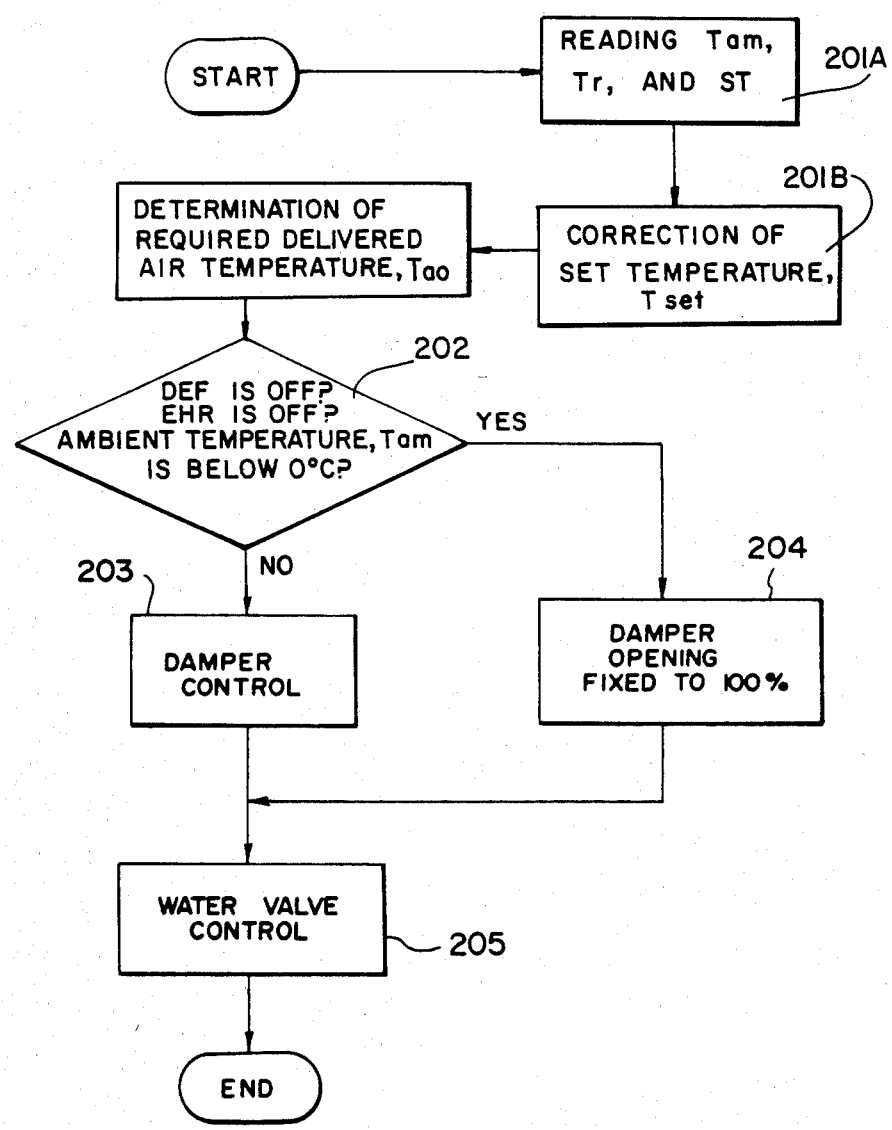
FIG. 2 is a process flow chart showing the fundamental control according to the present invention.

First, as A/M (Air Mixture) damper opening calculation is a fundamental control in the air conditioner control, A/M damper control and basic temperature control are processed by CPU 1 in accordance with the flow chart shown in FIG. 2.

In a step 201A, different temperatures including the internal air temperature Tr, ambient temperature Tam, and solar radiation temperature ST are read. A set temperature Tset is read out from the ROM in accordance with a temperature selected by an occupant of the motor vehicle. For example, the selection of the temperature may be effected by manipulating a heat control lever provided on a control panel 17. In a step 201B, the thus selected set temperature Tset is corrected by the ambient air temperature Tam and the solar radiation temperature ST as follows:

$$Tset = Kset - Ka1(Tam - 10) - Ka2 \cdot ST \qquad (1)$$

where: Ka1 and Ka2 are constants. Since ST is detected by the solar radiation sensor 26 as a dimension of (K cal/m$^2$ min.), ST is converted to a dimension of (°C.) prior to the calculation of formula (1).

Subsequently, in a step 201C the required delivered air temperature Tao is calculated through an equation (2) shown below based on the set temperature Tset calculated through the equation (1).

$$Tao = Kset \cdot Tset - Kam \cdot Tam - Kr \cdot Tr - Ks \cdot ST + C \qquad (2)$$

where Kset, Kam, Kr, Ks and C are constants.

Figure 3:
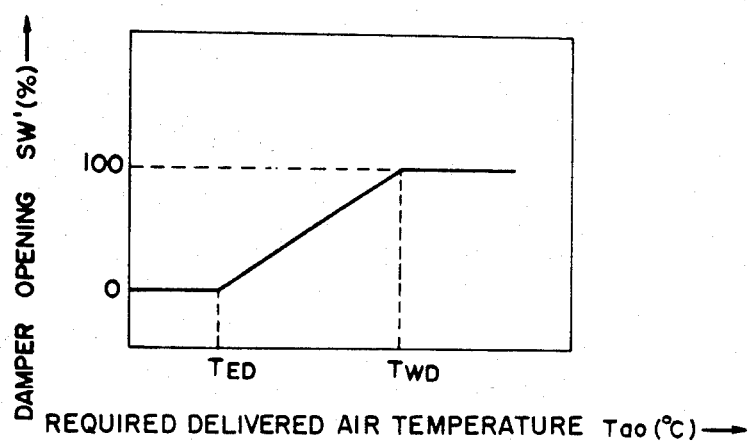
FIG. 3 is a curve of damper opening characteristics in relation to required delivered air temperatures.

In a step 202, the judgement is made as to whether the ambient temperature Tam is below 0° C. and whether the DEF and the Ex-Hi relays are "OFF". If Yes, the process proceeds to a step 203. The process in step 203 is as follows: The damper opening SW' is obtained from FIG. 3 on the basis of the required delivered air temperature Tao calculated by formula (2). A characteristic curve shown in FIG. 3 is defined in such a manner that the damper opening SW' is set to 100% with respect to a corrected water temperature $T_{WD}$ (°C.), and the damper opening SW' is set to 0% with respect to a corrected evaporator outlet temperature Ted (°C.). In this case, Twd and Ted are calculated through equations shown below.

$$Twd = (Tw - Ted)\phi + Ted \qquad (3)$$

$$Ted = Te + 3 \qquad (4)$$

where Tw is water temperature, $\phi$ a constant and Te the evaporator outlet temperature.

Figure 4:
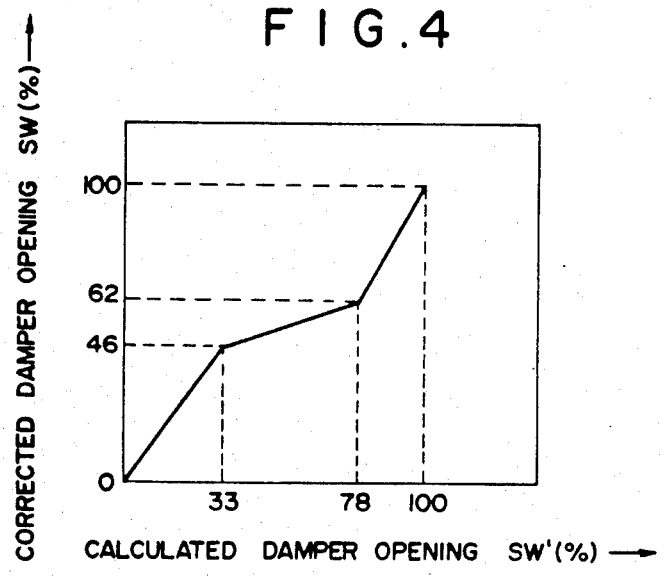
FIG. 4 is an explanatory view showing the damper opening correction.
Figure 5:
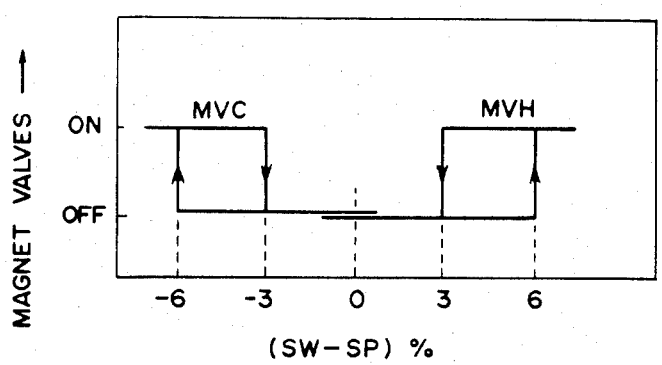
FIG. 5 is an explanatory view showing the control characteristic of a magnet valve.

Namely, the damper opening SW' obtained in accordance with FIG. 3 is corrected in accordance with FIG. 4 so that a corrected damper opening SW is obtained. The solenoid valves MVC and MVH are controlled as shown in FIG. 5 in accordance with a subtractive result (SW-SP). SP is indicative of an actual damper opening sensed by the potentiometer 25. In response to the control of FIG. 5, the actual damper opening SP becomes equal to the corrected damper opening SW.

Figure 6:
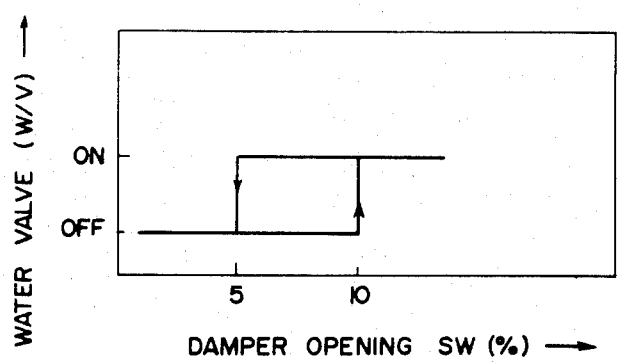
FIG. 6 is an explanatory view showing the control characteristic of a water valve.

Additionally, the water valve WV is controlled so as to obtain the characteristics shown in FIG. 6. This process corresponds to the process in step 205 shown in FIG. 2. The water valve WV is on-off operated within the range of the thus set damper opening. In an example shown in FIG. 6, the water valve WV is controlled within the range of 5 to 10%. Description will hereunder be given of compressor control.

The magnetic clutch of the compressor is turned off when the heater relay 36 is off or when air-conditioner is off by operation of an air-conditioner switch provided on the control panel 7. The air conditioner may be brought into the ON state by voice command. The compressor is controlled by four modes shown below.
 (i) control by the ambient air temperature Tam
 (ii) control by (Tao-Tam)
 (iii) control by (Tao-Te)
 (iv) control by relative humidity RH and discomfort index Di(RH-Di)

Any one of the above-described controls is selected in accordance with data prestored on a magnetic card or a magnetic tape, for example. The magnetic card or tape may be inserted into the control panel 7. Alternately, any one of controls (i)–(iv) may be selected by data entered by a vehicle occupant via a panel switch on the control panel 7.

The control by the ambient air temperature Tam mentioned in (i) above is carried out such that the compressor is turned "ON" when the ambient air temperature exceeds a predetermined value, and the compressor is turned "OFF" when the ambient air temperature is below the predetermined value. This control mode relies only on the ambient air temperature Tam. The control by (Tao-Tam) mentioned in (ii) above is carried out such that a difference in temperature between the recirculated air and the fresh air is set at a predetermined value, and the compressor is on-off operated. The control by (Tao-Te) mentioned in (iii) above is carried out such that, for example, when a difference in temperature between the recirculated air and the fresh air is 1° C., the compressor is turned "ON", and, when the difference is 3° C., the compressor is turned "OFF". The control by (RH-Di) mentioned in (iv) above is carried out so that, for example, when the abovedescribed difference is 5%, the compressor is turned "ON" and, when the difference is 0%, the compressor is turned "OFF".

In addition to the above described on-off control of the compressor, the controls of the air conditioner include recirculated air-fresh air switching control, air outlet control, air flow control, condensation control and air purifier control.

The apparatus according to the present invention is applied to the above-described air-conditioner so that the recirculated air-fresh air switching control, air outlet switching control and air purifying control are effected by corresponding voice commands. The preferred embodiment of the present invention will be explained hereunder, referring to FIGS. 1, 7 and 8.

The voice command is received by a microphone MIC to produce a voice signal which is signal-processed by the voice recognizing equipment 4. The voice recognizing equipment 4 comprises a plurality of band pass filters, a multiplexer and an A/D converter as is well known. The voice signal is filtered by the band pass filters and in turn is supplied to the A/D converter through the multiplexer. The A/D converter converts the input into a digital signal which is supplied to the CPU1 through the I/O 15. The outputs from the I/O 15 have patterns corresponding to the voice command and each pattern is compared with predetermined patterns prestored in the ROM to recognize the voice commands by the CPU1. In addition, normally, control modes (for example, a manual operation by use of a panel switch) having priority over the voice control are present, and further, control modes (controls by use of various sensors and external components) being lower in the order of priority than the voice control are present.

In the voice control to be described hereunder, all of the controls having priority over the voice control are in non-operation conditions, and only the voice control is functioning and in a stand-by condition. Additionally, the respective voice commands are constantly, sequentially decoded by the program stored in ROM of CPU 1 to be successively read.

Figure 7:
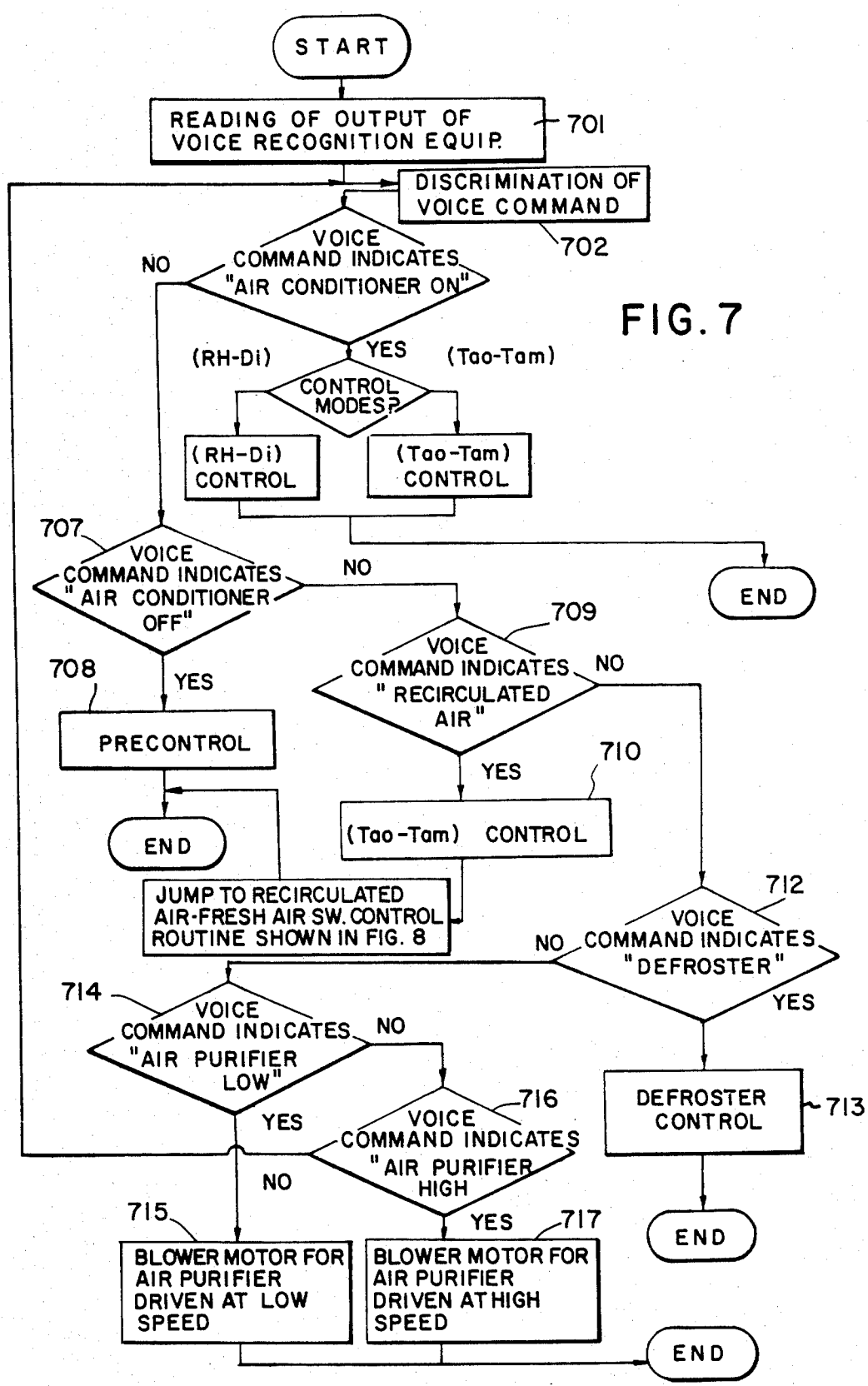
FIG. 7 is a process flow chart showing the control by voice command according to the present invention.

Upon start of a routine of control by voice command shown in FIG. 7, the output of the voice recognizing equipment is read so that the voice command is discriminated by CPU1 (in steps 701 and 702). When a voice commend indicative of "air-conditioner on" is discriminated in a step 703, an indication of "A/C" is displayed on the CRT 6 and the process proceeds to a step 704 to determine which control modes are selected. If the (Tao-Tam) control is selected, the process goes to a step 705 where the (Tao-Tam) control is carried out. If the (RH-Di) control is selected, the process goes to a step 706 where the (RH-Di) control is carried out. Selection of either (Tao-Tam) control or (RH-Di) control is made in accordance with the data given from the magnetic card, magnetic tape, or the panel switch. Either the control by Tam or the control by (Tao-Te) may be adapted to be carried out. In addition, the indication of "A/C" is also displayed in response to the manual depression of an A/C switch. When the user pronounces a predetermined term such as "air conditioner off", the affirmative answer is given in a step 704, so that a precontrol is carried out in a step 708. The precontrol may be also carried out in response to manual turning off of the A/C switch. In the precontrol, the following controls are effected.

(a) Turning the heater relay 36 "OFF", and turning the compressor "OFF"
(b) Performing A/M damper control, water-valve control and air outlet control in normal ways.

When the voice command "Recirculated air" is pronounced, the affirmative answer is given in a step 709, so that the process goes to a step 710 where the (Tao-Tam) control is carried out. At the same time, indication "REC" is displayed on the CRT 6. Then the process goes to a step 711 to jump a step 801 in the recirculated air-fresh air switching control routine shown in FIG. 8. Referring to FIG. 8, upon receipt of the voice command "Recirculated Air", the valve 33 is driven from the "fresh air" mode to the "recirculated air" mode (step 801). After a first time period $t_1$ has elapsed, valve 33 is moved from the "recirculated air" mode to the "recirculated-fresh air mixture" mode (step 803). After a second time period $t_2$ has elapsed; valve 33 is driven from the "recirculated-fresh air mixture" mode to the "fresh air" mode (step 805).

Now, referring back to FIG. 7, when the voice command "Defroster" is pronounced, the affirmative answer is given in step 712, so that the process goes to a step 713 where a defroster control is carried out. At the same time, an indication of "DEF" is displayed on the CRT 6. In the step 713, the solenoid valve MVM1 is turned on and MVM2 is turned off to open the outlet for DEF. In this case, upon lapse of a predetermined time (for example, a time of 6 min set on a software timer according to the program) in the "DEF" condition of the air outlet, the air outlets are returned to the original condition (any of the conditions VENT, B/L and HEAT). Additionally, the condition VENT, B/L (BI-LEVEL) or HEAT is obtainable by controlling the solenoid valve MVM 1, 2 as shown in the table below.

| MVM | CONDITION OF BLOW-OUT OUTLET | | | |
| --- | --- | --- | --- | --- |
|  | VENT | HEAT | B/L | DEF |
| MVM 1 | OFF | ON | OFF | ON |
| MVM 2 | OFF | ON | ON | OFF |

Next, the pronouncing of the term "Air purifier low" or "Air purifier high" enables the air purifier control mode to be performed. This air purifier control is applied in the case the air in the compartment is contaminated by smoking and the like, and ventilation is effected by controlling the air purifier control relay 39. Used in this case are air contamination sensors 29 including a smoke sensor, a gas sensor and the like. When the voice command "Air purifier low" is pronounced, an affirmative answer is given in a step 714. Then the process goes to a step 715 where a blower motor for air purifier starts driving at low speed. When the command "Air purifier high" is pronounced, an affirmative answer is given in a step 716. Then the process goes to a step 716 where the blower motors starts driving at high speed. Durations of these voice controlled modes are controlled through the software timer by CPU 1, and, for example, a specified mode is maintained only for five minutes and then restored to the original control mode.

As has been described above, according to the present invention, the recirculated air-fresh air switching control and the air outlet switching control in the air conditioner control can be effected by voice command in addition to the manual operation. As a consequence, even during the running condition of the vehicle, the air conditioner can be controlled without letting hands go off the steering wheel, thereby improving the driving safety and facilitating controls.

It should be apparent to those skilled in the art that the above-described embodiment represents but one of the many possible specific embodiments of the present invention. Numerous and varied other embodiments can be devised by those skilled in the art without departing from the spirit and scope of the present invention.

What is claimed is:

1. Apparatus for controlling an air conditioner by voice commands, said air conditioner being controlled under a plurality of control modes including a fresh air mode and a recirculated air mode, the apparatus comprising:
   a voice recognizing means for recognizing predetermined voice commands announced by an operator to provide output signals corresponding to said voice commands, said predetermined voice commands corresponding to a fresh air mode or a recirculated air mode; and
   a central processing unit for changing the fresh air mode to the recirculated air mode in response to said output signal indicative of the recirculated air mode, for holding the recirculated mode during a predetermined period of time after the fresh air mode is changed to the recirculated mode, and, in response to lapse of the predetermined period of time, for changing the recirculated air mode back to the fresh air mode.

2. Apparatus for controlling an air conditioner by voice commands according to claim 1, the apparatus further comprising:
   a display means for displaying an indication of the recirculated air mode or the fresh air mode in response to the corresponding output signal from said voice recognizing means.

3. Apparatus for controlling an air conditioner by voice commands according to claim 2, wherein said display means comprises a C.R.T.

4. Apparatus for controlling an air conditioner by voice commands, said air conditioner being controlled under a plurality of modes including a fresh air mode and a recirculated air mode, the apparatus comprising:

a voice recognizing means for recognizing predetermined voice commands announced by an operator to provide output signals corresponding to said voice commands, said predetermined voice commands corresponding to said modes of the air conditioner, respectively;

a central processing unit for changing the fresh air mode to the recirculated air mode in response to said output signal indicative of the recirculated air mode, for holding the recirculated air mode during a first predetermined period of time after the fresh air mode is changed to the recirculated mode, for changing the recirculated mode to the fresh-recirculated air mixture mode when the first predetermined period of time has elapsed, for holding the fresh-recirculated air mixture mode during a second predetermined period of time after the recirculated air mode is changed to the fresh-recirculated air mixture mode, and for changing the fresh-recirculated air mixture mode to the fresh air mode when the second predetermined period of time is elapsed.

5. Apparatus for controlling an air conditioner by voice commands according to claim 4, the apparatus further comprising:

a display means for displaying indications of said modes and energization or de-energization of the air conditioner.

6. Apparatus for controlling an air conditioner by voice commands according to claim 5, wherein said display means comprises a C.R.T.

* * * * *